(12) United States Patent
Mixon

(10) Patent No.: US 12,000,129 B1
(45) Date of Patent: Jun. 4, 2024

(54) SINK INSTALLATION METHOD

(71) Applicant: Simply Sinks Franchising LLC, Acworth, GA (US)

(72) Inventor: Gregory Mixon, Acworth, GA (US)

(73) Assignee: Simply Sinks Franchising LLC, Acworth, GA (US)

( * ) Notice: Subject to any disclaimer, the term of this patent is extended or adjusted under 35 U.S.C. 154(b) by 161 days.

(21) Appl. No.: 17/858,503

(22) Filed: Jul. 6, 2022

Related U.S. Application Data

(60) Provisional application No. 63/220,168, filed on Jul. 9, 2021.

(51) Int. Cl.
*E03C 1/33* (2006.01)
*B32B 37/00* (2006.01)

(52) U.S. Cl.
CPC ............ *E03C 1/33* (2013.01); *B32B 37/0046* (2013.01); *Y10T 156/10* (2015.01)

(58) Field of Classification Search
CPC ... E03C 1/32; E03C 1/33; E03C 1/335; Y10T 156/10; B32B 37/0046; B32B 37/10; B29C 65/78; A47B 77/06
See application file for complete search history.

(56) References Cited

U.S. PATENT DOCUMENTS

| | | | |
|---|---|---|---|
| 9,476,190 B2 | 10/2016 | Cusimano | |
| 9,683,357 B2 | 6/2017 | Provencher | |
| 11,326,329 B2* | 5/2022 | Brooks | ..................... E03C 1/33 |

FOREIGN PATENT DOCUMENTS

CN 114521816 A * 5/2022

* cited by examiner

*Primary Examiner* — Carson Gross
(74) *Attorney, Agent, or Firm* — Walter A. Rodgers

(57) ABSTRACT

A sink installation method comprising the steps of configuring the countertop sink opening to conform to the new sink, placing the sink in the cabinet under the sink opening, placing a lift plate under the sink with a hook extending through the sink drain, placing a winch across the countertop opening, lowering a wire with a hook attached to the free end thereof by means of operation of the winch, interconnecting the lift plate hook and the winch cable hook, lifting the sink into position under the countertop, and adhering the new sink to the underside of the countertop.

12 Claims, 5 Drawing Sheets

SINK INSTALLATION METHOD

The benefits under 35 USC 119 are claimed of provisional patent application 63/220,168 filed Jul. 9, 2021.

BACKGROUND OF THE INVENTION

Undermount sinks have increased in popularity over the years whereby a sink is mounted under an opening in the kitchen or bath countertop. Undermount sinks are both aesthetically pleasing and practical as they do not have an undesirable rim around the top of the countertop opening which can collect debris when maneuvering utensils and other items across the countertop. Countertops are typically manufactured using solid materials such as granite, marble and engineered products and the sinks are adhered to the underside of the countertop by epoxy and the like and then secured in place by means of straps.

Traditionally, the installation of counter undermount sinks requires two installation technicians. One technician holds the sink in place while the other secures the sink using traditional straps and attachment clips. This method results in a less precise positioning of the sink and increases the risk of injury from holding the heavy sink against the hard countertop surface. The unnatural positioning of the installer's body and the relatively tight space often result in injury through muscular-skeletal strain on the installer's muscles.

BRIEF SUMMARY OF THE INVENTION

A method of installing an undermount sink, including the steps of reconfiguring the countertop sink opening to conform to the outer dimensions of the new sink, placing a lift plate having an upstanding hook on the floor of the sink cabinet, placing the new sink in the cabinet so that the lift plate hook extends through the sink drain opening, placing a winch apparatus having an extendable cable so that it overlaps the sides of the countertop opening, lowering the cable with a hook attached to the bottom of the cable, operating the winch so that the winch cable hook engages the upstanding lift plate hook, raising the sink by means of operation of the winch, placing an adhesive around the upper surface or the flange of the new sink, aligning the new sink with the countertop opening, and raising the sink so that it adheres to the underside of the countertop.

DETAILED DESCRIPTION OF THE INVENTION

Figure 1:
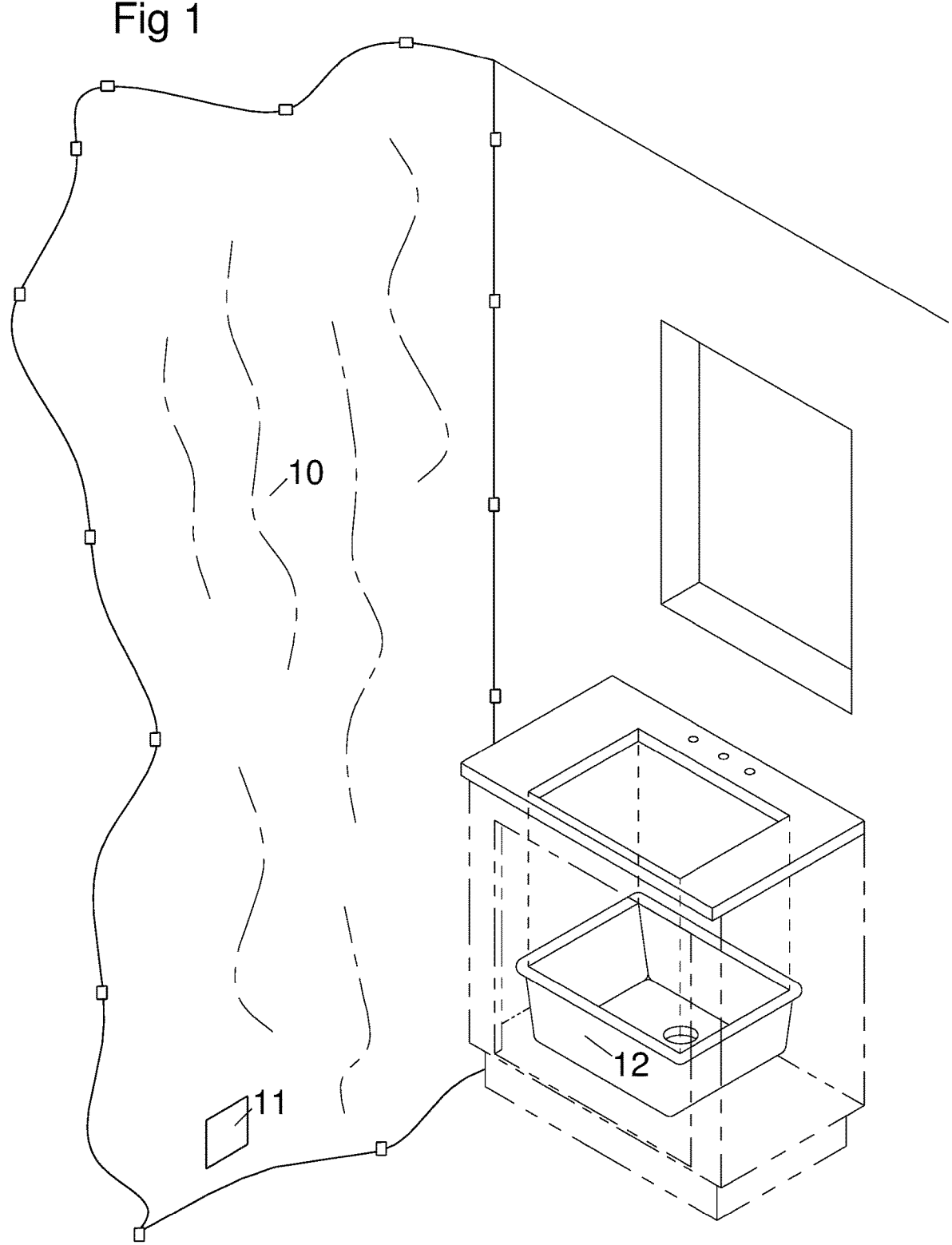
FIGS. 1 and 2 are perspective views showing various stages of the sink installation method according to this invention.
Figure 2:
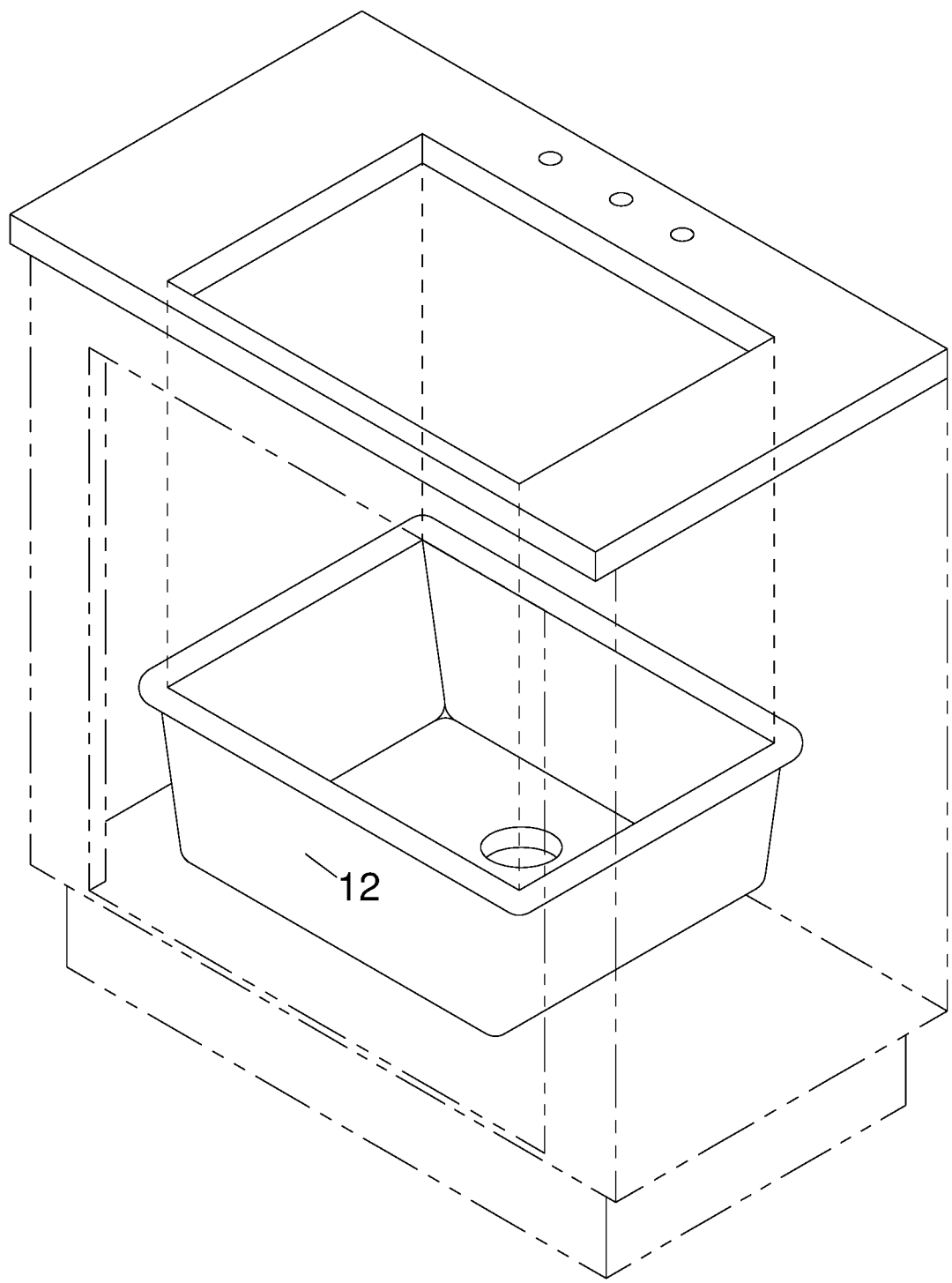

According to this invention, an improved sink installation method is provided wherein initially the old sink is removed from the countertop. Then, as shown in FIG. 1, the work area is enclosed by means of plastic sheet material 10 which is taped in place so as to reduce the amount of dust floating throughout the house or other dwelling during the installation process. A small opening 11 is formed at the bottom of the plastic material to allow ventilation of the dust away from the work area through an accessible window.

Following this, the sink opening in the countertop is overlaid with the new sink cutout and the cutout is appropriately taped. Then the edge of the opening is ground down to the desired dimension to accommodate new sink 12. Any remaining chips or flaws around the edge of the opening are repaired using a mixture of countertop particles and epoxy, as is well known. Sink 12 is then placed in the cabinet below the opening.

Figure 3:
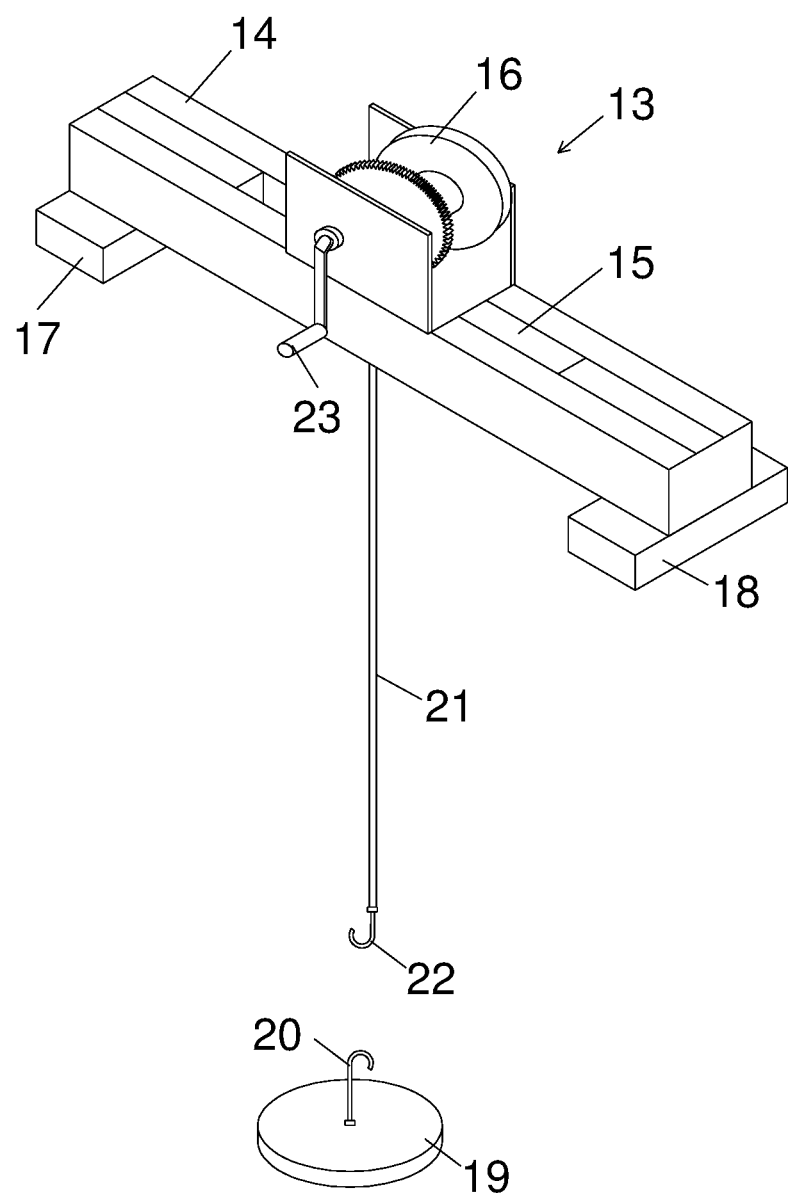
FIG. 3 is an enlarged perspective view of the winch apparatus and related structure.
Figure 4:
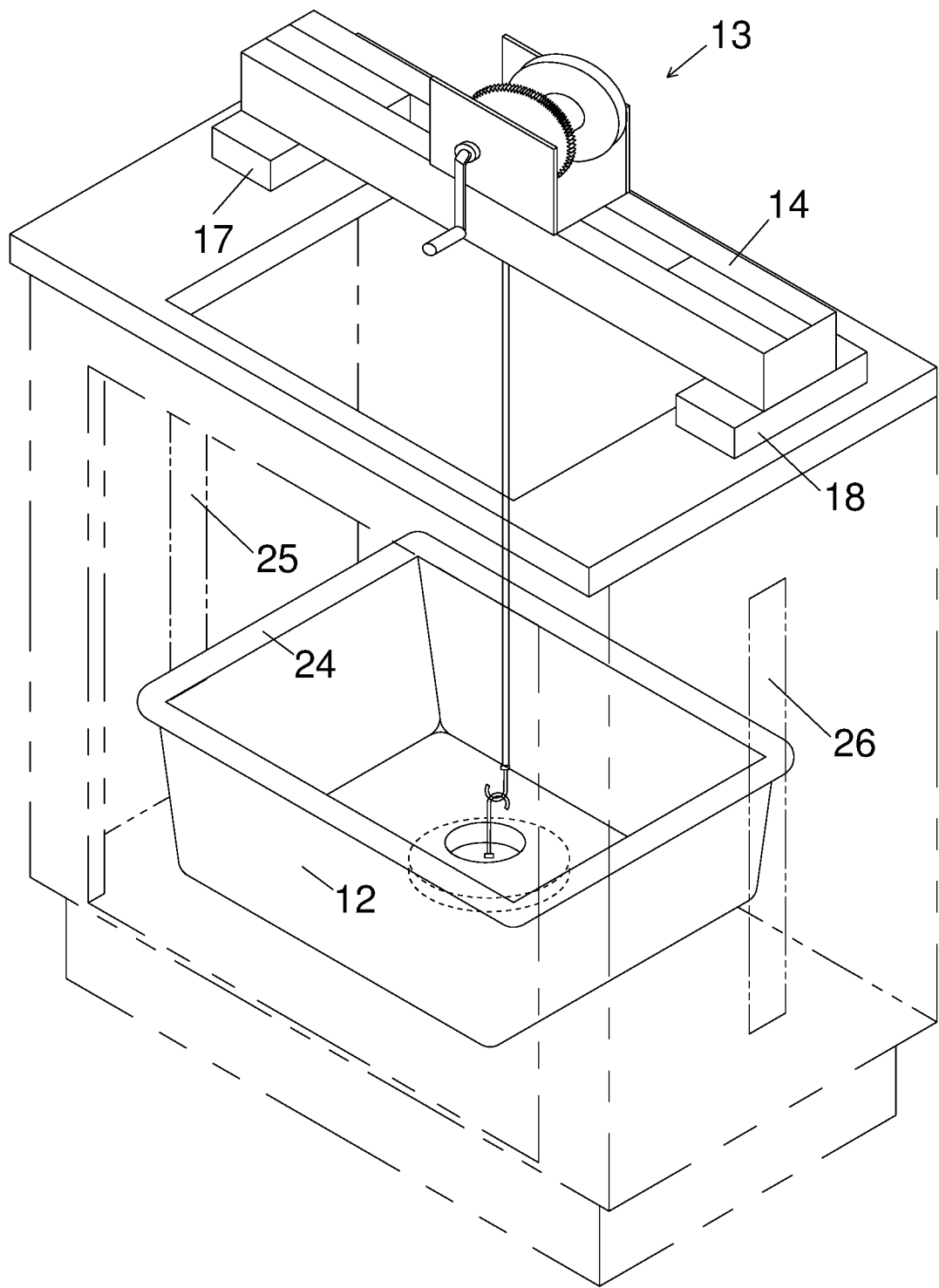
FIGS. 4 and 5 are perspective views depicting the final stages of the sink installation method.
Figure 5:
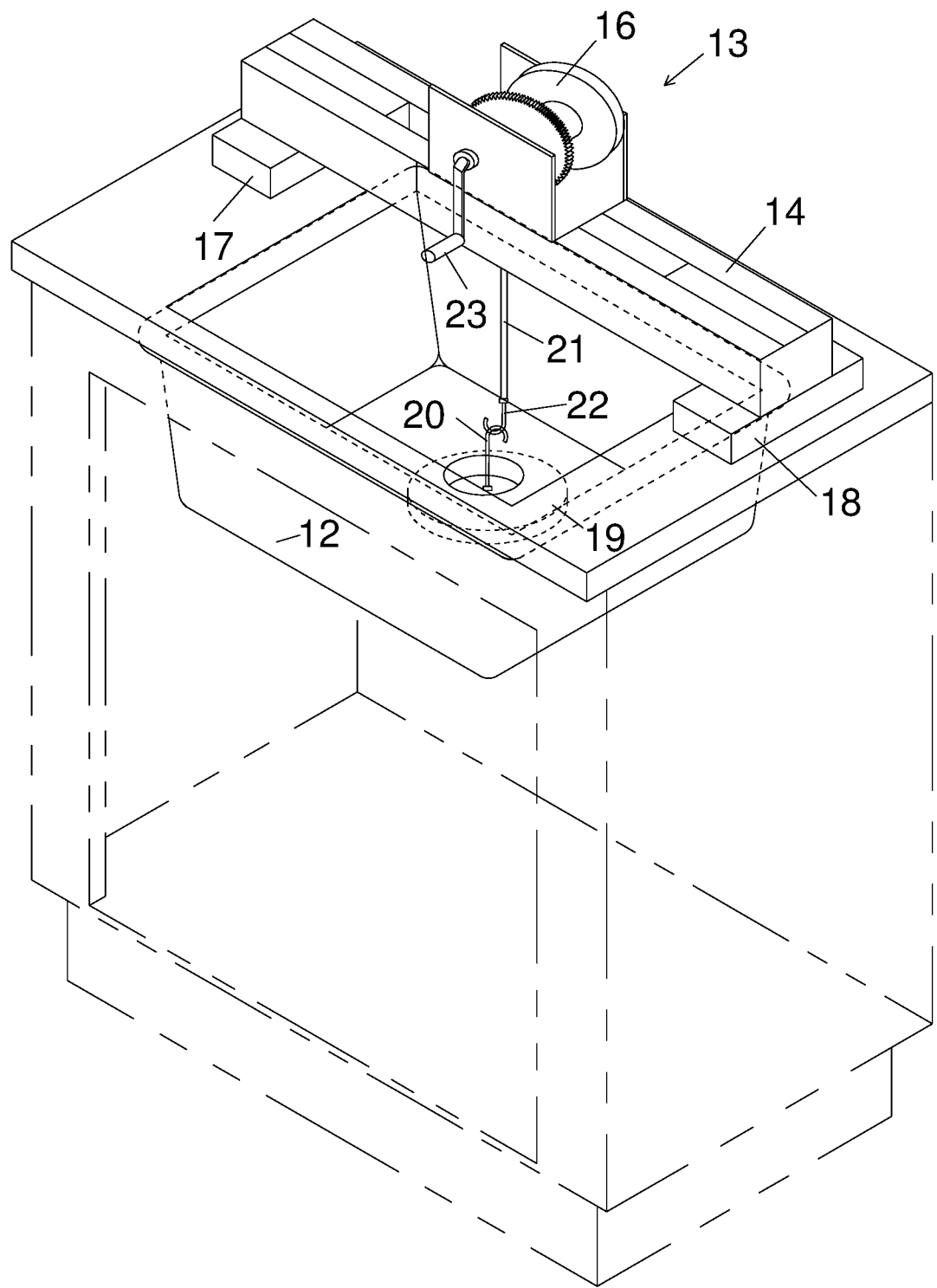

After the countertop is prepped to receive sink 12, winch apparatus, generally identified by the numeral 13, is placed across the sink opening, as best shown in FIGS. 4 and 5. As depicted in FIG. 3, winch apparatus 13 includes longitudinal support bar 14 having slot 15 formed therein with winch 16 slidably positioned on top of support bar 14. Protective pads 17 and 18 are secured to the bottom surface of support bar 14 at each end thereof.

According to this invention, lift plate 19 is positioned in the sink cabinet under sink 12 and includes hook 20 extending upwardly therefrom through the sink 12 drain. The diameter of lift plate 19 is larger than the diameter of the sink 12 drain. Cable 21 extends downwardly from winch 16 through slot 15. Hook 22 is attached to the lower end of cable 21. Hook 22 is lowered by manual rotation of winch handle 23. Hook 22 disposed on the free end of cable 21 is then interconnected to hook 20 of lift plate 19 which extends through the drain of sink 12.

As shown in FIG. 4, winch 16 is then rotationally manipulated by winch handle 23 so as to raise lift plate 19 until it engages the underside of the sink 12. Further rotation of winch handle 23 provides the ability to raise sink 12 to determine its precise final position. Sink 12 is then lowered a sufficient distance and winch 16 is locked to allow the application of an appropriate adhesive, such as silicone, to the upper edge 24 of sink 12.

Winch 16 is then unlocked and sink 12 is raised into position underneath the countertop ensuring that the periphery of sink 12 is evenly positioned under the countertop and adhered thereto.

Straps 25 and 26, which are attached to the cabinet wall on opposite sides of sink 12, are attached together and tightened in known manner so as to hold sink 12 in its permanent position. The rotation of winch handle 23 is then reversed to allow lift plate 19 to be lowered to the bottom of the cabinet whereby hooks 20 and 22 are disconnected and winch apparatus 13 and lift plate 19 are removed.

The sink installation method according to this invention is not only applicable to stone, ceramic and composite-type sinks but also to stainless steel sinks by which the adhesive is applied to the outer flange disposed around the upper edge of the sink.

Therefore, by this invention, a method is provided to install a new sink into position using only one technician. By this means, the installation of the new sink is accomplished efficiently and quickly and at a lower cost to the consumer.

The invention claimed is:

1. A method of installing a sink at an opening on an underside of a countertop comprising the steps of:
    placing a winch apparatus having an extendable cable across the countertop opening,
    placing the sink having an upper edge below the countertop opening in a sink cabinet disposed below the countertop opening,
    lowering said cable through the countertop opening,
    positioning a lift plate under the sink,
    interconnecting said cable and said lift plate, applying adhesive to the upper edge of the sink, and
activating said winch apparatus to raise said sink into contact with a lower surface of said countertop.

2. The method according to claim 1, further comprising enclosing the countertop opening with plastic,
forming a vent in the plastic, and
removing dust from the enclosure.

3. The method according to claim 1 wherein a periphery of said countertop opening is ground down to conform to an outer dimension of said sink.

4. The method according to claim 3 wherein any imperfections in an edge of the countertop opening after the grinding process are repaired with a mixture of countertop particles and epoxy.

5. The method according to claim 1 wherein said cable of said winch apparatus comprises a hook attached to a free end of said cable.

6. The method according to claim 5 wherein said winch apparatus is manually operable by means of a winch crank.

7. The method according to claim 1 wherein said winch apparatus is mounted on a support bar and a slit is formed in said support bar.

8. The method according to claim 1 wherein said lift plate comprises a hook upstanding therefrom.

9. The method according to claim 1 wherein after said sink is initially raised into contact with the lower surface of said countertop, said sink is lowered a desired distance from said countertop, and said winch apparatus is locked.

10. The method according to claim 9 wherein a flange extends around said upper edge of said sink and adhesive is applied to an upper surface of said flange.

11. The method according to claim 9 wherein said winch apparatus is unlocked, adhesive is applied to said upper edge, and said sink is raised into contact with the lower surface of said countertop and adhered thereto.

12. The method according to claim 11 wherein straps are interconnected respectively to sides of said cabinet and free ends of said straps are interconnected and tightened.

\* \* \* \* \*